United States Patent [19]

Louis

[11] Patent Number: 5,114,786
[45] Date of Patent: May 19, 1992

[54] FLAME RETARDANT POLYAMIDE FABRICS

[75] Inventor: Henry Louis, Wyckoff, N.J.

[73] Assignee: Apex Chemical Corp., Elizabethport, N.J.

[21] Appl. No.: 543,226

[22] Filed: Jun. 25, 1990

[51] Int. Cl.$^5$ .................. C09K 21/08; D06M 11/57; D06M 13/21
[52] U.S. Cl. .................................. 428/270; 8/115.7; 8/128.1; 8/115.64; 252/608; 428/272; 428/920
[58] Field of Search ................ 428/920, 270, 272; 8/128.1, 115.7, 115.64; 252/608

[56] References Cited

U.S. PATENT DOCUMENTS 3,772,067 11/1973 Alderson .......................... 117/136
3,927,962 12/1975 Friedman et al. .................. 8/17
4,277,379 7/1981 Hermann et al. ................. 252/608
4,302,203 11/1981 Hermann et al. ................. 8/490
4,447,242 11/1984 Beniser ............................. 8/128

OTHER PUBLICATIONS

Friedman et al., *Textile Research Journal* 44 (12) 994-6 (1974).

*Primary Examiner*—James C. Cannon
*Attorney, Agent, or Firm*—Kane, Dalsimer, Sullivan, Kurucz, Levy, Eisele and Richard

[57] ABSTRACT

An improved method for flame retarding a synthetic polyamide or blend fabric thereof comprises treatment with a solution of an ionizable tetrabromophthalate together with an electrolyte, such as magnesium sulfate, acidified to pH 2 such as with sulfuric or sulfamic acid. The treated fabric shows useful resistance to washing.

13 Claims, No Drawings

FLAME RETARDANT POLYAMIDE FABRICS

BACKGROUND OF THE INVENTION

1. Field of the Invention

This invention refers to a process for the flame retardant treatment of polyamide fabrics or blended fabrics having a substantial polyamide content. The invention also refers to the treating bath and to the fabrics thus treated.

2. Brief Description of the Prior Art

Polyamide fabrics, such as the nylons, have been quite difficult to flame retard. For applications such as curtains, draperies, wall coverings, and upholstery, some degree of wash resistance of the flame retardant finish is desired. Finishes based on thiourea-formaldehyde have been used but these are now recognized as having undesirable toxicological features, odor, and loss of tactile quality. Treatments which consist of applying decabromodiphenyl ether together with antimony oxide and a binder resin are known but these entail costly high add-ons with loss of hand (tactile quality) and undesirable white pigmentation. Most recently, environmental and toxicological concerns have also been raised with respect to decabromodiphenyl ether.

Effective flame retardant finishes for wool are known based on tetrabromophthalic acid and its salts. Tetrabromophthalic anhydride has been applied to wool as well as wool-nylon blends under dyebath conditions was taught by Friedman et al., Textile Res. J. 44 (12), 994–6 (1974), and specifically the use on wool by Friedman et al., U.S. Pat. No. 3,927,962 (1975). The use of tetrabromophthalic anhydride or acid along with potassium hexafluorozirconate is described in a number of publications and patents by Benisek or Benisek et al., exemplified by U.S. Pat. No. 4,447,242 (1984). The use of a finely dispersed tetrabromophthalate salt as a flame retardant treatment for wool is described by Hermann et al. (to Apex Chemical Co.), U.S. Pat. No. 4,277,379 (July 1981) and U.S. Pat. No. 4,302,203 (Nov. 24, 1981), both of which are incorporated herein by reference.

The use of tetrabromophthalic acid or anhydride to flame retard nylon or blends thereof has also been claimed by Alderson, U.S. Pat. No. 3,772,067 (1973) which is referred to without further elaboration by Friedman et al., Textile Research Journal 1974, 44 (12), 994–6. However, such treatments are non-durable to washing, and have found no practical usage. Moreover, the process of Alderson involves the use of an organic carrier, benzyl alcohol, which imposes substantial problems of air and water pollution as well as flammability in handling.

Although applicant has had long experience in applying the Hermann et al. flame retardant to wool and wool-nylon blends with a preponderance of wool, the Hermann et al. flame retardant has not hitherto given effective and durable flame retardant finish on wool-nylon blends of over 20% nylon or on nylon itself.

One probable reason for the poor durability of tetrabromophthalic acid-based finishes on nylon or high nylon wool-nylon blends is that, in contrast to wool which has a fairly high concentration of amino groups along the polyamide chain, synthetic polyamides have only at most one or two amino end groups and offer few sites for binding of tetrabromophthalic acid or its anions.

I have now found surprisingly that by the introduction of a critical amount of an electrolyte into an aqueous solution of an ionizable tetrabromophthalate, substantially free of organic solvent, and at a certain critical pH range, an effective wash-resistant flame retardant treatment of synthetic polyamide fabrics can be achieved. My new process is also effective on blends of synthetic polyamides with wool or other fibers, the process having a major advantage over prior processes when applied to wool-polyamide blends having 20% or more of polyamide.

SUMMARY OF THE INVENTION

The process of the invention comprises the treatment of the synthetic polyamide fabric or blend containing a substantial proportion of a synthetic polyamide with an aqueous solution comprising an ionizable tetrabromophthalate, a sufficient amount of acid (sulfuric acid and sulfamic acid being preferred) to adjust the pH of the solution to or below 2, and an electrolyte (magnesium sulfate being strongly preferred) in an amount effective for enhancing the uptake of the tetrabromophthalate, at a temperature from about 80° C. to about 120° C.

My invention also comprises the treating bath for use in the above process and the fabric thus treated.

DETAILED DESCRIPTION OF THE INVENTION

The synthetic polyamides which, in the form of fabric or yarn, which are advantageously given a flame retardant treatment by the process of my invention, include any fiber-forming thermoplastic polymers which have repeating units of the amide type, i.e. —N—C(=O)—in a chain which otherwise has a carbon-linked backbone. Examples of such synthetic polyamides are the nylons, such as nylon 6,6, 6,11, 6,12 and 4,6, where the first digit is the number of methylene groups in the diamine moiety and the second digit is the number of carbon atoms in the dicarboxylic acid moiety. Other suitable polyamides are those made by polymerization of cyclic lactams, for instance nylon 6 and nylon 12. It is also within the scope of the invention to treat aromatic polyamides such as poly-m-phenylene isophthalamide and poly-p-phenylene terephthalamide, which, although relatively flame resistant compared to the aliphatic nylons, nevertheless need improvement for demanding applications such as flame retardant work garments, military fabrics, firefighters' uniforms and aircraft upholstery.

Blends of such synthetic polyamide fibers with other textile fibers include blends with wool, cotton, rayon, polyolefin and acrylic fibers. A preferred family of blends for use in the invention are the synthetic polyamide-wool blends, since the reactant system of my invention works outstandingly well on both fiber components. Although the related prior art system of Hermann et al. performed satisfactorily on wool-nylon blends of 20% or less nylon, the new process of the present invention performs well on the entire range of wool-nylon blends however high the nylon percentage, and since effective methods were hitherto lacking for treating blends of wool with greater than 20% nylon, such blends demonstrate my process to greatest advantage.

Suitable fabrics for the process of the invention can be woven, knit, non-woven, or even in the form of filament, tow or yarn to be later made into fabric.

The term "ionizable tetrabromomophthalate" used herein refers to the tetrabromophthalic acid and its salts, which are known and commercially-accessible compounds. At the pH range specified for the process of the invention, tetrabromophthalic acid will be partly in the unionized acid form and partly in the ionized form. Tetrabromophthalic acid can be introduced into the treatment solution as the free acid, as the anhydride (which will hydrolyze to the acid), as the mono or disalt of potassium, sodium, ammonium, magnesium or of an amine, provided only that the pH be adjusted to the specified range of about 2 or below before or during the treatment of the fabric. An effective amount of the tetrabromophthalic acid or salt is at least about 10% by weight of the fabric, calculated as tetrabromophthalic acid. Since the treatment bath can have a wide range of ratios of bath weight to fabric weight, and since the tetrabromophthalate mostly exhausts onto the fabric, it is not meaningful to give concentrations (amounts relative to the treating bath) of the treating chemicals. As is known in the fabric dyeing art, concentrations are more meaningful when referenced to the fabric weight. Therefore, percents given herein are to be understood as "on weight of fabric (owf)" unless stated otherwise.

The added electrolyte, a key feature of my invention, must be a water-soluble ionized salt, and empirically I have found that the electrolyte must be added in an effective amount which is about 0.3 moles per kg of fabric. Suitable electrolytes include for example ammonium sulfate, ammonium sulfamate, sodium sulfate, potassium sulfate, sodium chloride, potassium chloride, magnesium sulfate or magnesium chloride. Magnesium sulfate has been found substantially more effective and is preferred. The reason for this outstanding activity of magnesium sulfate is not understood, but it has been experimentally demonstrated by repeated trials.

The treatment of the invention must be carried out at a temperature between about 80° C. and 120° C., most conveniently at the atmospheric boiling point, or somewhat above this point by use of a pressure dyeing vessel. The time must be sufficient for the uptake of the tetrabromophthalic acid moiety by the fabric and will be typically in the range of about 5 minutes to about 5 hours, most typically about 10 minutes to about 2 hours. Following the uptake of the tetrabromophthalic acid by the fabric, the latter is washed and dried.

Although this treatment affords a highly useful degree of wash durability, typically from 1 to 5 launderings with detergent, a feature of the invention is that the durability to washing can be further improved by an aftertreatment with a fixative, preferably antimony lactate.

As will be known to those versed in the art of flame retarding fabrics, the use of bromoaromatic compounds may cause some light-induced discoloration and/or dye shade change. Therefore in one advantageous mode of practicing the invention, an ultraviolet screening agent is included in a the main step of the flame retardant treatment or in an aftertreatment. Such ultraviolet screening agents include the known effective hydroxybenzotriazoles as well as hydroxybenzophenones, oxanilides and cinnamic esters. An effective amount is usually in the 0.05% to 5% range, the amount needed in any given case depending on the screening agent, the fabric, the dye, and the degree of shade change tolerated.

Other adjuvants can also be employed in the process of the invention, such as wetting agents, optical brighteners and dyes, softeners, weatherproofing agents, and the like.

The invention encompasses, besides the process of flame retarding nylon fabric, the treatment bath itself and the fabric so treated.

To further explain my invention and to make evident the best mode of practicing the invention, the following examples are given, and are not intended to be limiting.

EXAMPLE 1

A tetrabromophthalate potassium salt slurry was made up in accordance with U.S. Pat. No. 4,277,379 as follows:

A stainless steel kettle equipped with good agitation, heating and cooling was charged with 100 lbs. of water, 20 lbs. of polyethylene glycol (MW 200), 2.5 lbs. of triethanolamine, 42.5 lbs. of a non-ionic emulsifying agent (alkoxylated aryl polymer) and 40 lbs. of sorbitol. After mixing was complete, 10 lbs. of an anionic dispersing agent (the sodium salt of a formaldehyde-naphthalenesulfonic acid condensate) was added and the mixture stirred until all these additions were dissolved. With continued stirring, 500 lbs. of tetrabromophthalic anhydride were then added and mixed until uniformly dispersed. 121.5 lbs of 45% KOH were then added. The reaction was exothermic. The mix was then heated to about 90°–95° C. and stirring continued at 90°–95° C. until a smooth soft uniform paste was formed. The mix was then cooled to 75° C. and 163.5 lbs. of a 2.6% Xanthan gum solution was then added, the mix stirred until uniform and water added as necessary to make 1000 lbs. of paste (slurry). The resultant product was a smooth uniform paste of 65–66% solids, pH 2–3. The content of equivalent tetrabromophthalic acid is 50% by weight. The essential ingredients used to make this formulation are the tetrabromophthalic anhydride, the KOH, and the water. The other ingredients are preferred because they aid storage stability and ease of mixing and handling.

A treatment bath was made up with 25% of the tetrabromophthalate salt paste (slurry) made as described above, introduced at 40° C. along with the fabric. The temperature was raised and when the bath began to clear at 60°–70° C., 10% owf magnesium sulfate and 10% owf sulfamic acid was added and the bath brought to a boil for 30 minutes. The bath was then dropped (the fabric removed) and the fabric was then rinsed and dried at 300° F. for four minutes. This procedure was carried out on two different styles ("400" and "8400") of nylon 66 fabric.

The NFPA 701 test was run with the following results:

Afterflame times: 0, 0, 0 for each style of fabric. Char lengths: 2.5, 2.5, 2,5 (one style), 3.5, 3.25, 3.25 (other style) These results pass NFPA 701 specifications both before and after an AATCC IIA wash.

The treated fabrics were also subjected to the British upholstered furniture fabric test BS5852 after a leaching with 0.5% soda ash and 0.5% Apexomine 511 surface active agent at 140°–160° F. for 30 minutes. The fabrics gave results as follows:

| Style | Cigarette Test | Match Test |
|-------|----------------|------------|
| 400 | 18 min. 35 sec., no smolder | Pass |
| 8400 | 15 min. 3 sec., no smolder | Pass |

These are all passing results by the British fabric standard.

EXAMPLE 2

A treatment similar to that of the foregoing example was run on Velcro, a form of nylon fabric used for attachments. The treated fabric was found to be self extinguishing by the Federal Motor Vehicles Safety Standard 302 test method. By the Federal Aeronautics Authority test method, the treated fabric exhibited a 5-6 second self-extinguishing time and 3.25-4.5-inch char, well within the allowed maximum of 15 second self-extinguishing time and 8-inch char.

EXAMPLE 3

A 100% worsted spun nylon, 10 oz./sq.yd. fabric weight, was introduced to the tetrabromophthalate solution of the composition given in Example 1, at 160° F. Immediately thereafter, 10% owf of magnesium sulfate and 10% owf of sulfamic acid were introduced into the treating bath, and the treatment continued as in Example 1. The rinsed and dried fabric was then evaluated for flammability by the NFPA 701 test. Afterflame time was zero for all samples and char length was 3-3.5 inches. After two washes of AATCC Type IIA (see Technical Manual of the American Association of Textile Chemists and Colorists, 1989 edition, Test 61-1986, for description of this standard wash method), the fabric gave afterflame times of 0-1 second and char lengths of 2.75-3.5 inches.

EXAMPLE 4

A 100% nylon fabric was treated by the method described in example 3 but instead of 10% magnesium sulfate and 10% sulfamic acid, the electrolyte added consisted of 5% owf of magnesium sulfate, 5% owf of ammonium sulfate, and 5% sulfuric acid added to pH 2. The resultant fabric passed the NFPA 701 flammability test before and after two washes of the type AATCC IIA.

EXAMPLE 5

A comparison of several electrolytes was conducted as follows: Example 1 was repeated, using 25% of the tetrabromophthalate formulation, with the following electrolytes added, with the pH being adjusted to 2 with sulfuric acid:

10% magnesium sulfate
10% diammonium sulfate
10% sodium sulfate
10% potassium hexafluorozirconate
10% of a mixture of 50% magnesium sulfate and 50% diammonium sulfate All of these applications showed equivalent flame retardancy by NFPA 701 when tested prior to washing; all had zero afterflame time and 2 ¼ to 2 ½" char lengths. All continued to show the same flame retardancy after one wash (AATCC type IIA). However, only the application done using the 10% magnesium sulfate passed NFPA 701 by a significant margin after three washes; the application with the 5% magnesium sulfate plus 5% diammonium sulfate was a borderline pass at three washes.

A series of similar experiments were run using 10% magnesium sulfate and 25% of a modified tetrabromophthalate formulation; in this series, in place of the potassium salt of tetrabromophthalic acid, the sodium, ammonium, ethylene diamine, and triethanolamine salts, or the free acid were used. The flame retardancy results were similar in the case of each of these initial salts or corresponding free acid.

EXAMPLE 6

Following the procedure of example 1, 100% nylon fabric was subjected to a treatment bath made up of 12.5% disodium tetrabromophthalate (the equivalent amount of tetrabromophthalate to the 25% of the paste used in example 1), adjusted to pH 2 with sulfuric acid and with 10% magnesium sulfate added. The resultant fabric was flame retardant by NFPA 701 before and after an AATCC type IIA wash. This showed that the other formulation adjuvants in the formulation used in Exp. 1 besides the tetrabromophthalate, electrolyte and pH-adjusting acid were not essential but optional ingredients.

EXAMPLE 7

To compare the effect of the choice of acid used to acidulate the treatment bath, a comparison was run in a series of treatments on 100% nylon fabric, using, in all cases, 25% of the paste as made in example 1 along with 10% sodium sulfate (an electrolyte of the non-preferred group), with the following acids being used to adjust the bath to pH 2:

sulfuric acid
phosphoric acid
oxalic acid
p-toluenesulfonic acid
citric acid
no acid Only in the case of sulfuric acid was the resultant fabric able to pass the NFPA 701 flammability test. The poorest result (longest afterflame time) was with no acid.

EXAMPLE 8

A treatment as in example 1 was given to nylon 6 fabric but wherein the magnesium component was introduced as magnesium carbonate-hydroxide and the pH adjusted to pH 8. The resultant fabric was not flame retardant, since it burned completely even before washing.

Two similar experiments were run wherein the treating bath was adjusted to pH 5-5.5. with sulfuric acid in one case and to pH 5 with acetic acid in the other case. In neither case were the fabrics rendered flame retardant, since they showed afterflame times of 24-35 seconds by the NFPA 701 test.

EXAMPLE 9

A comparison of various electrolytes was carried out with 25% of the tetrabromophthalate formulation described in Example 1 and all acidified to pH 2 by use of sulfuric acid. Treatment of nylon 6 fabric was done for ½ hour at the boil. The afterflame times (AFT) initially and after a series of AATCC IIA washes were determined. The electrolytes and results are shown in the following table:

| Electrolyte | AFT Initial | Washes before NFPA 701 failure |
|---|---|---|
| 10% $MgSO_4$ | 0 | 3-4 |
| 10% $(NH_4)_2SO_4$ | 0 | 1-2 |
| 10% $Na_2SO_4$ | 0 | 1-2 |
| 10% $KZrF_6$ | 0 | 1-2 |

-continued

| Electrolyte | AFT Initial | Washes before NFPA 701 failure |
|---|---|---|
| 5% MgSO$_4$ + 5% (NH$_4$)$_2$SO$_4$ | 0 | 2-3* |

*almost passed at 3 washes

These data showed that a variety of electrolytes afforded a somewhat wash-resistant finish but the advantage of the MgSO$_4$ was evident.

EXAMPLE 10

A nylon 6 fabric was treated for ½ hour at the boil with 25% of the tetrabromophthalate formulation of Example 1 with 10% magnesium sulfate as the added electrolyte and then given an aftertreatment with antimony lactate solution at 2%, acidified by tannic and formic acids, for 15 minutes. The fabric showed enhanced resistance to loss of flame retardancy upon washing.

Similar results were obtained in a comparible experiment using 1.5% of the antimony lactate solution.

EXAMPLE 11

A series of ½ hour treatments at the boil were run on nylon 6 fabric, using 25% of the tetrabromophthalate formulation described in example 1, plus MgSO$_4$ at 5, 10, 15, 20 and 25% owf. In every case the fabric passed NFPA 701 after one laundering.

EXAMPLE 12

A series of ½ hour treatments at the boil were run on the same nylon 6 fabric using a heavy concentration, 40% owf, of MgSO$_4$ and various levels of the tetrabromophthalate formulation, namely 5, 10, 15, 20 and 25% owf. All passed NFPA 701 except for the 5 and 10% levels of the tetrabromophthalate.

EXAMPLE 13

A series of ½ hour treatments were run on nylon 6 fabric at the boil with 25% of the tetrabromophthalate formulation, adjusted to pH 2 by sulfuric acid, and using, in place of 10% MgSO$_4$ (0.83 moles per kg fabric), a series of alternative electrolytes, namely 10% AlCl$_3$ (0.75 moles per kg fabric), 10% Al$_2$(SO$_4$)$_3$ (0.29 moles per kg fabric), 10% ZnSO$_4$ (0.82 moles per kg of fabric).

All passed NFPA 701 after 1 wash except for the Al$_2$(SO$_4$)$_3$, indicating that this electrolyte was present at a sub-effective amount.

What I claim:

1. A process for imparting a wash-durable flame retardant finish to a fabric comprising a synthetic polyamide which comprises subjecting said fabric to an effective amount of an aqueous ionizable tetrabromophthalate in the presence of an effective uptakeaccelerating amount of magnesium sulfate at a pH having a maximum of about 2 and at a temperature between about 80° and 120° C.

2. The process of claim 1 where said fabric consists essentially of a nylon.

3. The process of claim 1 where said fabric consists essentially of nylon 66.

4. The process of claim 1 where said fabric consists essentially of nylon 6.

5. The process of claim 1 where said fabric is a nylon-wool blend.

6. The process of claim 1 where said fabric is a aromatic polyamide.

7. The process of claim wherein said pH is adjusted by the use of an acid selected from the group consisting of sulfuric acid and sulfamic acid.

8. The process of claim 1 wherein said electrolyte is present at above about 0.3 mole per kilogram of fabric.

9. The process of claim 1 wherein said electrolyte is magnesium sulfate at above about 5% on the weight of the fabric, and where said tetrabromophthalate is at above about 10% on the weight of the fabric, and where an acid selected from sulfuric acid and sulfamic acid is employed to adjust said pH to about 2.

10. The process of claim 1 wherein an effective amount of an ultraviolet screening agent is included in the treating solution.

11. A process for flame retarding a fabric comprising a synthetic polyamide wherein the fabric treated as in claim 1 is subsequently treated with an effective durability-improving amount of antimony lactate.

12. A treating bath for the flame retarding of a polyamide which comprises the composition of claim 1.

13. A flame retardant polyamide fabric as produced by the process of claim 1.

* * * * *